(12) United States Patent
Lu (10) Patent No.: US 10,250,173 B1
(45) Date of Patent: Apr. 2, 2019

(54) POWER GENERATOR SYSTEM AND GENERATOR EXCITER DEVICE THEREOF

(71) Applicant: KUTAI ELECTRONICS INDUSTRY CO., LTD., Kaohsiung (TW)

(72) Inventor: Wen-Feng Lu, Kaohsiung (TW)

(73) Assignee: KUTAI ELECTRONICS INDUSTRY CO., LTD., Kaohsiung (TW)

( * ) Notice: Subject to any disclaimer, the term of this patent is extended or adjusted under 35 U.S.C. 154(b) by 0 days.

(21) Appl. No.: 15/708,667

(22) Filed: Sep. 19, 2017

(51) Int. Cl.
*H02P 9/30* (2006.01)
*H02M 3/335* (2006.01)

(52) U.S. Cl.
CPC ............ *H02P 9/305* (2013.01); *H02M 3/335* (2013.01)

(58) Field of Classification Search
CPC ............ H02P 9/305; H02P 9/48; H02M 3/335
USPC .......................................................... 322/28
See application file for complete search history.

(56) References Cited

U.S. PATENT DOCUMENTS

| 3,008,082 | A | * | 11/1961 | Schlicher | H02P 9/305 322/100 |
|---|---|---|---|---|---|
| 3,899,731 | A | * | 8/1975 | Smith | H02P 9/302 322/25 |
| 4,262,856 | A | * | 4/1981 | Nakagawa | G11B 23/037 242/608.8 |
| 4,315,204 | A | * | 2/1982 | Sievers | G01R 31/007 322/28 |
| 4,410,848 | A | * | 10/1983 | Frierdich | H02P 9/107 322/25 |
| 4,451,774 | A | * | 5/1984 | Akita | H02J 7/24 320/123 |
| 4,695,786 | A | * | 9/1987 | Menniti | H02P 9/305 322/60 |
| 4,733,157 | A | * | 3/1988 | Malesani | H02P 9/38 322/28 |
| 6,081,103 | A | * | 6/2000 | Pierret | H02J 7/245 318/254.2 |
| 6,339,316 | B1 | * | 1/2002 | Eguchi | H02P 9/305 322/28 |
| 8,198,871 | B2 | * | 6/2012 | Wild | H02P 9/10 322/44 |
| 8,569,907 | B2 | * | 10/2013 | O'Gorman | H02J 7/245 307/10.1 |
| 2003/0095025 | A1 | * | 5/2003 | Maehara | H02P 9/305 336/155 |
| 2007/0296275 | A1 | * | 12/2007 | Joho | H02P 9/30 307/47 |
| 2008/0084639 | A1 | * | 4/2008 | Harmon | H02P 9/48 361/20 |

(Continued)

*Primary Examiner* — Sean Gugger
(74) *Attorney, Agent, or Firm* — Muncy, Geissler, Olds & Lowe, P.C.

(57) ABSTRACT

A power generator system includes a field winding, an alternator, a voltage regulator and a generator exciter device. The field winding generates a magnetic field based on a total excitation voltage thereacross. The alternator generates an output voltage based on the magnetic field. The voltage regulator generates a primary excitation voltage based on the output voltage. The generator exciter device generates an auxiliary excitation voltage. The generator exciter device and the voltage regulator are coupled in series across the field winding, so that the auxiliary excitation voltage and the primary excitation voltage are summed into the total excitation voltage which is not less than the primary excitation voltage in magnitude.

8 Claims, 8 Drawing Sheets

(56) References Cited

U.S. PATENT DOCUMENTS

2012/0007428 A1* 1/2012 Rozman .................... H02J 3/36
307/66
2012/0262128 A1* 10/2012 Sasaki ..................... H02P 9/305
322/8

\* cited by examiner

POWER GENERATOR SYSTEM AND GENERATOR EXCITER DEVICE THEREOF

FIELD

The disclosure relates to power generation, and more particularly to a power generator system and a generator exciter device thereof.

BACKGROUND

For a self-excited power generator system that generates AC (alternating current) output power, when a load thereof suddenly increases, a voltage amplitude of the AC output power drops due to insufficiency of the AC output power, and requires a relatively long time to recover to a value immediately before the drop. A conventional generator exciter device can be used in the self-excited power generator system to reduce the drop and the recovery time. The conventional generator exciter device can provide power to a voltage regulator of the self-excited power generator system, so the voltage regulator can provide more power to excite a field winding of the self-excited power generator system. However, without modification, the conventional generator exciter device can only be used with a few types of voltage regulators.

SUMMARY

Therefore, an object of the disclosure is to provide a power generator system that can alleviate the drawback of the prior art, and a generator exciter device of the same.

According to an aspect of the disclosure, the power generator system includes a field winding, an alternator, a voltage regulator and a generator exciter device. The field winding has a first input terminal and a second input terminal, receives a total excitation voltage at the first and second input terminals thereof, and generates a magnetic field based on the total excitation voltage. The alternator generates an output voltage based on the magnetic field generated by the field winding. The voltage regulator has a first output terminal and a second output terminal, is coupled to the alternator for sensing the output voltage therefrom, and generates a primary excitation voltage at the first and second output terminals thereof based on the sensed output voltage. The generator exciter device has a first output terminal and a second output terminal, and generates an auxiliary excitation voltage at the first and second output terminals thereof. The first and second output terminals of the generator exciter device are coupled respectively to the first input terminal of the field winding and the first output terminal of the voltage regulator, and the second output terminal of the voltage regulator is coupled to the second input terminal of the field winding, so that the auxiliary excitation voltage and the primary excitation voltage are summed into the total excitation voltage which is not less than the primary excitation voltage in magnitude.

According to another aspect of the disclosure, the generator exciter device is used in a power generator system that includes a field winding, an alternator and a voltage regulator. The field winding has a first input terminal and a second input terminal, receives a total excitation voltage at the first and second input terminals thereof, and generates a magnetic field based on the total excitation voltage. The alternator generates an output voltage based on the magnetic field generated by the field winding. The voltage regulator has a first output terminal, and a second output terminal that is coupled to the second input terminal of the field winding. The voltage regulator is coupled further to the alternator for sensing the output voltage therefrom, and generates a primary excitation voltage at the first and second output terminals thereof based on the sensed output voltage. The generator exciter device includes a first output terminal, a second output terminal, an inverter and a rectifier. The inverter is used to receive a DC (direct current) input voltage, and converts the DC input voltage to generate an AC (alternating current) inverted voltage. The rectifier is coupled to the inverter for receiving the AC inverted voltage therefrom, is coupled further to the first and second output terminals of the generator exciter device, and rectifies the AC inverted voltage to generate an auxiliary excitation voltage at the first and second output terminals of the generator exciter device. The first and second output terminals of the generator exciter device are used to be coupled respectively to the first input terminal of the field winding and the first output terminal of the voltage regulator, so that the auxiliary excitation voltage is summed with the primary excitation voltage to produce the total excitation voltage which is not less than the primary excitation voltage in magnitude.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
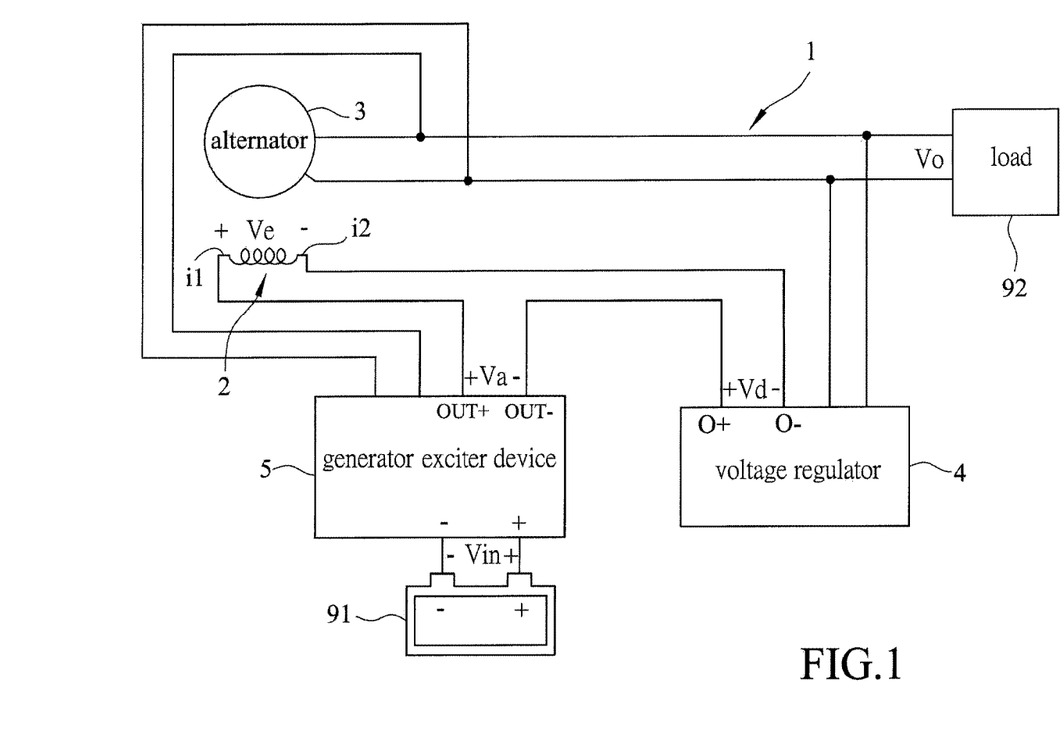
FIG. 1 is a circuit block diagram illustrating an embodiment of a power generator system according to the disclosure.

Referring to FIG. 1, an embodiment of a power generator system 1 according to the disclosure includes a field winding 2, an alternator 3, a voltage regulator 4 and a generator exciter device 5.

The field winding 2 has a first input terminal (i1) and a second input terminal (i2), receives a total excitation voltage (Ve) at the first and second input terminals (i1, i2) thereof, and generates a magnetic field based on the total excitation voltage (Ve) (e.g., a magnitude of the total excitation voltage (Ve)).

The alternator 3 generates, based on the magnetic field (e.g., strength of the magnetic field) generated by the field winding 2, an output voltage (Vo) that is an AC (alternating current) voltage and that is used to power a load 92.

The voltage regulator 4 has a first output terminal (O+) and a second output terminal (O−), is coupled to the alternator 3 for sensing the output voltage (Vo) therefrom, and generates a primary excitation voltage (Vd) at the first and second output terminals (O+, O−) thereof based on the sensed output voltage. In this embodiment, the primary excitation voltage (Vd) is a DC (direct current) voltage.

The generator exciter device 5 has a first output terminal (OUT+) and a second output terminal (OUT−), and generates an auxiliary excitation voltage (Va) at the first and second output terminals (OUT+, OUT−) thereof. In this embodiment, the auxiliary excitation voltage (Va) is a DC voltage.

The first and second output terminals (OUT+, OUT−) of the generator exciter device 5 are coupled respectively to the first input terminal (i1) of the field winding 2 and the first output terminal (O+) of the voltage regulator 4, and the second output terminal (O−) of the voltage regulator 4 is coupled to the second input terminal (i2) of the field winding 2. In other words, the generator exciter device 5 and the voltage regulator 4 are coupled in series across the field winding 2. Therefore, the auxiliary excitation voltage (Va) and the primary excitation voltage (Vd) are summed into the total excitation voltage (Ve) that is not less than the primary excitation voltage (Vd) in magnitude. It should be noted that the first output terminal (OUT+) of the generator exciter device 5 and the first output terminal (O+) of the voltage regulator 4 are positive output terminals in this embodiment, but may be negative output terminals in other embodiments.

In this embodiment, the voltage regulator 4 increases the primary excitation voltage (Vd) when determining that an amplitude of the sensed output voltage is less than a predetermined reference voltage value, and decreases the primary excitation voltage (Vd) when determining that the amplitude of the sensed output voltage is greater than the predetermined reference voltage value, so as to stabilize an amplitude of the output voltage (Vo) at the predetermined reference voltage value.

Figure 2:
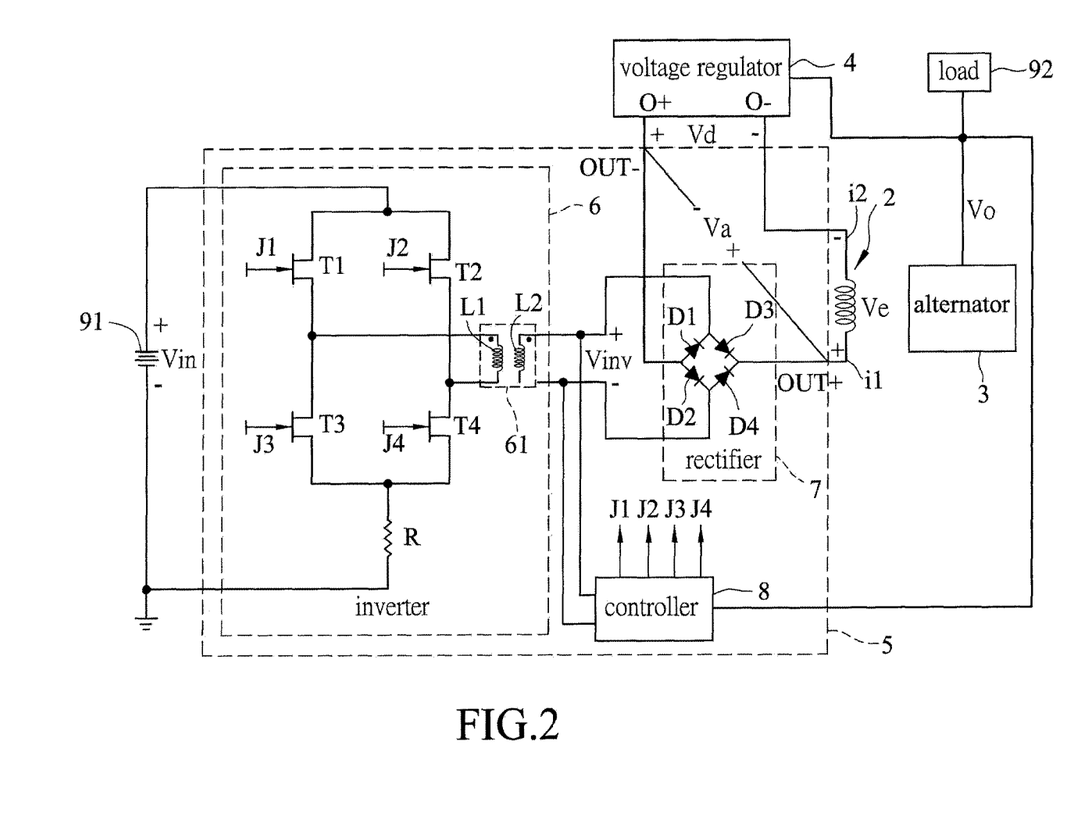
FIG. 2 is a circuit block diagram illustrating a generator exciter device of the embodiment.

Referring to FIG. 2, in this embodiment, the generator exciter device 5 includes an inverter 6, a rectifier 7 and a controller 8.

The inverter 6 is used to receive a DC input voltage (Vin) from, for example, a battery 91, further receives a control input, and converts the DC input voltage (Vin) based on the control input to generate an AC inverted voltage (Vinv).

In this embodiment, the inverter 6 includes four switches (T1-T4), a resistor (R) and a transformer 61, and the control input includes four control signals (J1-J4). The switch (T1) has a first terminal that is used to receive the DC input voltage (Vin), a second terminal, and a control terminal that receives the control signal (J1). The switch (T2) has a first terminal that is coupled to the first terminal of the switch (T1), a second terminal, and a control terminal that receives the control signal (J2). The switch (T3) has a first terminal that is coupled to the second terminal of the switch (T1), a second terminal, and a control terminal that receives the control signal (J3). The switch (T4) has a first terminal that is coupled to the second terminal of the switch (T2), a second terminal that is coupled to the second terminal of the switch (T3), and a control terminal that receives the control signal (J4). The resistor (R) is coupled between the second terminal of the switch (T3) and ground. The transformer 61 includes a primary winding (L1) and a secondary winding (L2). The primary winding (L1) has a first terminal that is coupled to the second terminal of the switch (T1), and a second terminal that is coupled to the second terminal of the switch (T2). The secondary winding (L2) has a first terminal and a second terminal that cooperatively provide the AC inverted voltage (Vinv). The first terminals of the primary and secondary windings (L1, L2) have the same voltage polarity. Each control signal (J1-J4) is transitionable between an inactive state (e.g., being at a logic low level, and corresponding to non-conduction of the corresponding switch (T1-T4)) and an active state (e.g., being at a logic high level, and corresponding to conduction of the corresponding switch (T1-T4)).

Figure 3:
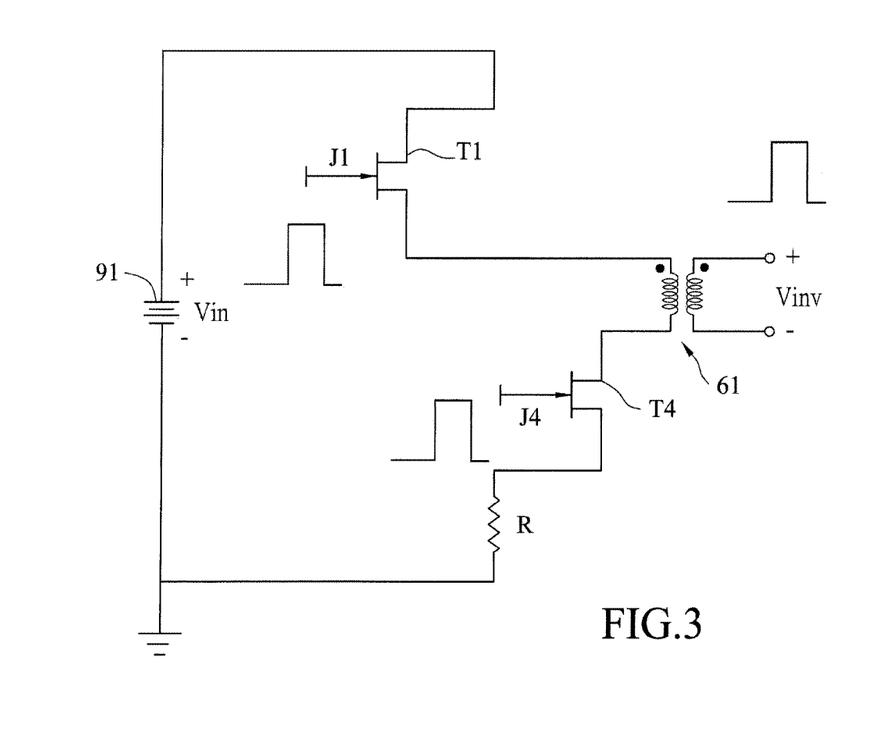
FIGS. 3 and 4 are circuit diagrams illustrating operation of an inverter of the generator exciter device.
Figure 4:
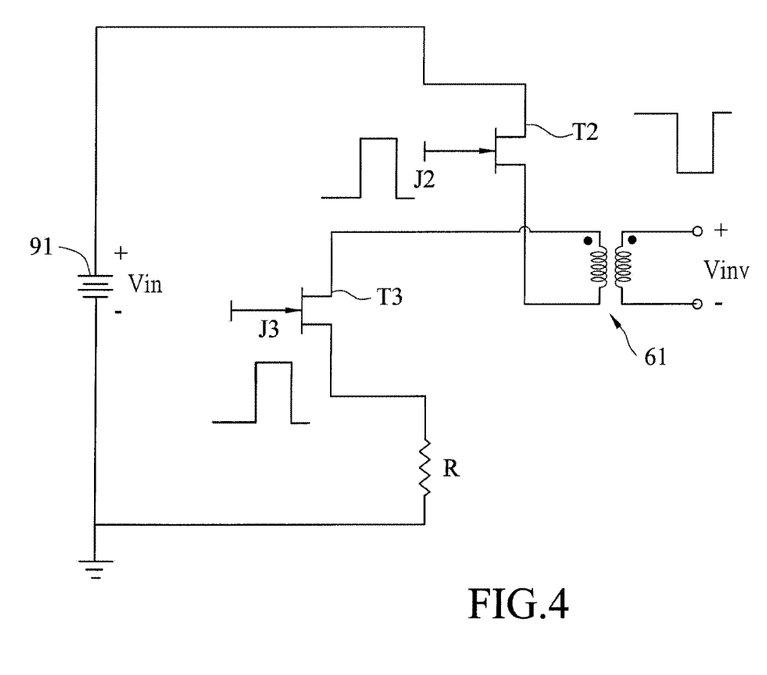

Referring to FIGS. 2 to 4, the inverter 6 operates sequentially in first and second modes during each switching cycle. In FIGS. 3 and 4, components that cannot conduct are not depicted. As shown in FIG. 3, in the first mode, the control signals (J1-J4) are generated in such a way that the switches (T2, T3) both do not conduct, and that the switches (T1, T4) can both conduct. When the switches (T1, T4) both conduct, the AC inverted voltage (Vinv) has a non-zero magnitude (which increases with increasing conduction time of the switches (T1, T4)) and a positive polarity. As shown in FIG. 4, in the second mode, the control signals (J1-J4) are generated in such a way that the switches (T1, T4) both do not conduct, and that the switches (T2, T3) can both conduct. When the switches (T2, T3) both conduct, the AC inverted voltage (Vinv) is non-zero in magnitude, increases in magnitude with increasing conduction time of the switches (T2, T3), and is negative in polarity. In this embodiment, the switches (T1-T4) have the same conduction time during each switching cycle.

Referring to FIG. 2, a voltage across the resistor (R) is positively proportional to a current flowing through the primary winding (L1), and can be used in over-current protection of the inverter 6. Since the feature of the disclosure does not reside in the over-current protection of the inverter 6, which is known to those skilled in the art, details of the same are omitted herein for the sake of brevity.

The rectifier 7 is coupled to the first and second terminals of the secondary winding (L2) for receiving the AC inverted voltage (Vinv) therefrom, is coupled further to the first and second output terminals (OUT+, OUT−) of the generator exciter device 5, and rectifies the AC inverted voltage (Vinv) to generate the auxiliary excitation voltage (Va) at the first and second output terminals (OUT+, OUT−) of the generator exciter device 5.

Figure 5:
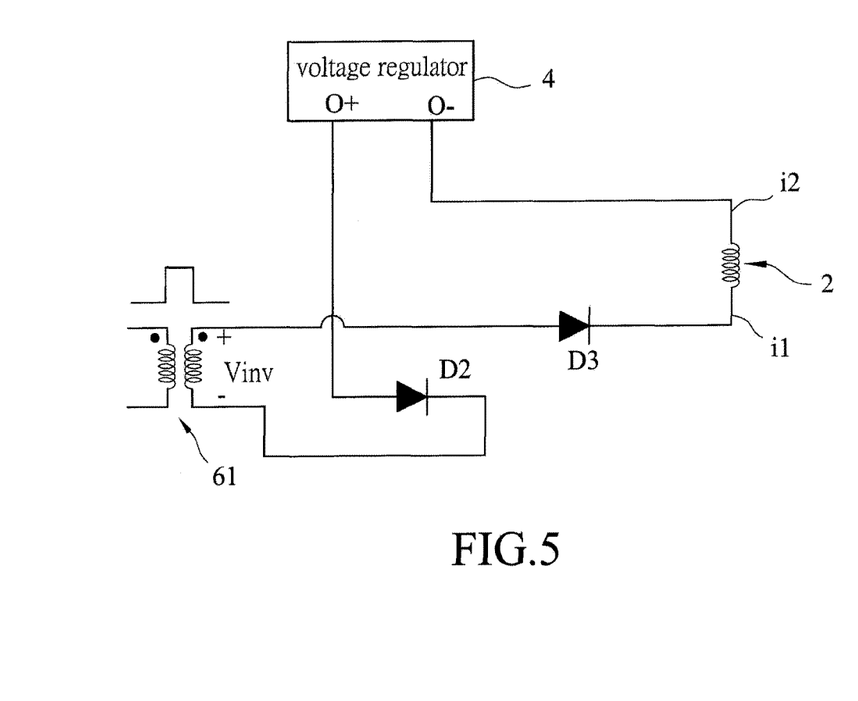
FIGS. 5 and 6 are circuit block diagrams illustrating operation of a rectifier of the generator exciter device.
Figure 6:
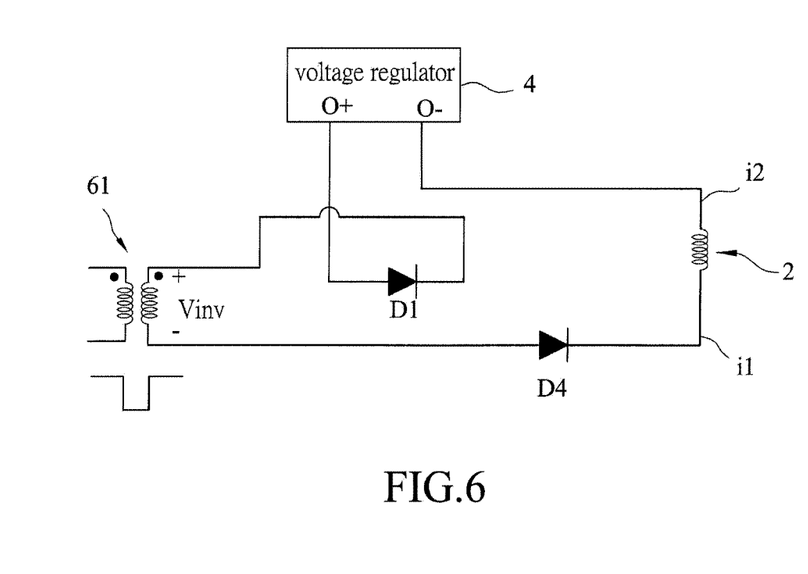
Figure 7:
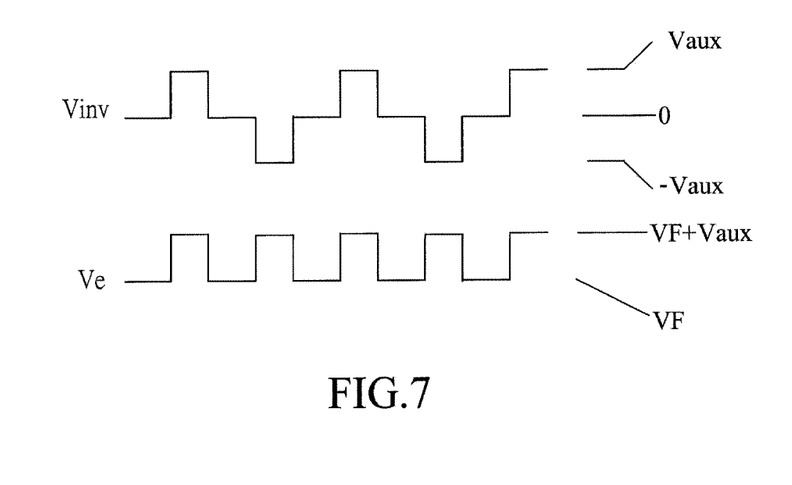
FIG. 7 is a timing diagram illustrating an AC (alternating current) inverted voltage and a total excitation voltage of the embodiment.

Referring to FIGS. 2 and 5 to 7, in this embodiment, the rectifier 7 includes four diodes (D1-D4). The diode (D1) has an anode that is coupled to the second output terminal (OUT−) of the generator exciter device 5, and a cathode that is coupled to the first terminal of the secondary winding (L2). The diode (D2) has an anode that is coupled to the anode of the diode (D1), and a cathode that is coupled to the second terminal of the secondary winding (L2). The diode (D3) has an anode that is coupled to the cathode of the diode (D1), and a cathode that is coupled to the first output terminal (OUT+) of the generator exciter device 5. The diode (D4) has an anode that is coupled to the cathode of the diode (D2), and a cathode that is coupled to the cathode of the diode (D3). As shown in FIG. 5 (where non-conducting components are not depicted) and FIG. 7, when the polarity of the AC inverted voltage (Vinv) is positive, the diodes (D2, D3) both conduct while the diodes (D1, D4) both do not conduct, and the total excitation voltage (Ve) has a magnitude of VF+Vaux (where VF denotes a magnitude of the primary excitation voltage (Vd) and Vaux denotes an amplitude of the AC inverted voltage (Vinv)). As shown in FIG. 6 (where non-conducting components are not depicted) and FIG. 7, when the polarity of the AC inverted voltage (Vinv) is negative, the diodes (D1, D4) both conduct while the diodes (D2, D3) both do not conduct, and the magnitude of the total excitation voltage (Ve) is VF+Vaux. Otherwise, the diodes (D1, D3) both conduct and/or the diodes (D2, D4) both conduct, and the magnitude of the total excitation voltage (Ve) is VF.

Referring to FIG. 2, the controller 8 is coupled to the alternator 3 and the first and second terminals of the secondary winding (L2) for sensing the output voltage (Vo) and the AC inverted voltage (Vinv) respectively therefrom, is coupled further to the control terminals of the switches (T1-T4), and generates, based on the sensed output voltage and the sensed AC inverted voltage, the control signals (J1-J4) for respectively controlling the switches (T1-T4) such that the AC inverted voltage (Vinv) is associated with the output voltage (Vo).

Figure 8:
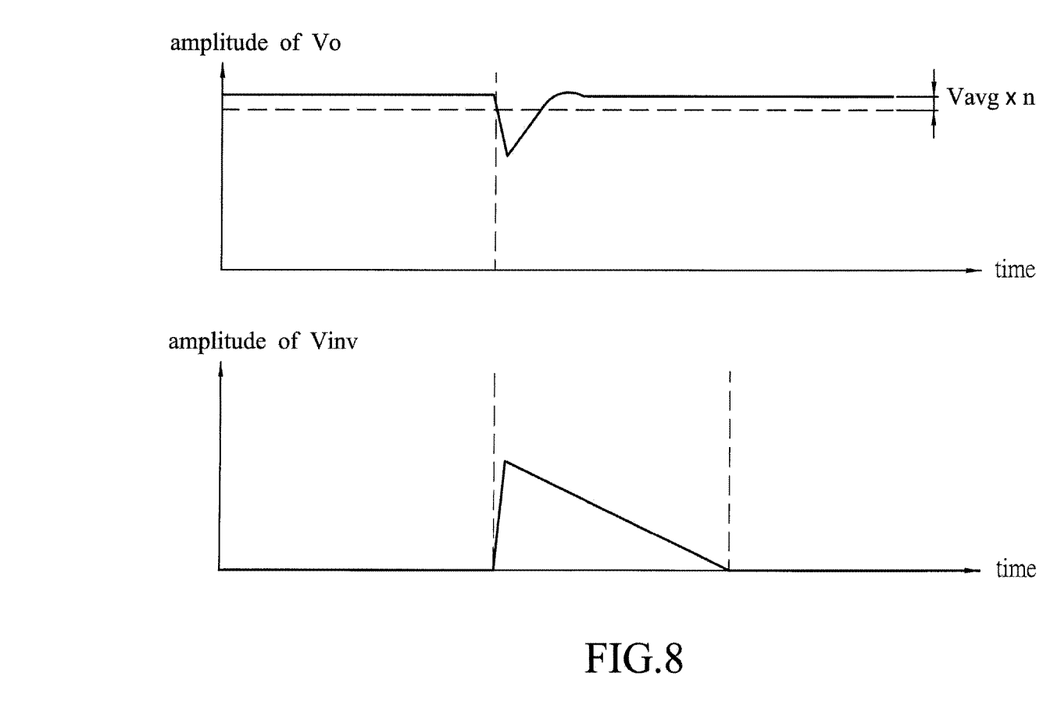
FIG. 8 is a timing diagram illustrating an amplitude of an output voltage and an amplitude of the AC inverted voltage of the embodiment.

Referring to FIGS. 2 and 8, in this embodiment, when determining that a ratio of a drop of the amplitude of the sensed output voltage to the amplitude of the sensed output voltage immediately before the drop is greater than or equal to a threshold value (n), the controller 8 calculates a target voltage value based on the ratio, and generates the control signals (J1-J4) based on the sensed AC inverted voltage and the target voltage value in such a way that the amplitude of the AC inverted voltage (Vinv) is stabilized at the target voltage value. In an example, the ratio is obtained according to the following equation:

$$Rd=(Vavg-Vi)/Vavg,$$

where Rd denotes the ratio, Vavg denotes a moving average of the amplitude of the sensed output voltage, and Vi denotes an instantaneous value of the amplitude of the sensed output voltage; and the target voltage value is calculated according to the following equation:

$$Vtg=Rd\times Gain,$$

where Vtg denotes the target voltage value, and Gain denotes a predetermined gain. Respective pulse widths of the control signals (J1-J4) (which respectively correspond to the respective conduction times of the switches (T1-T4)) are increased if an amplitude of the sensed AC inverted voltage is less than the target voltage value, and are decreased if the amplitude of the sensed AC inverted voltage is greater than the target voltage value. Moreover, when determining that the ratio of the drop of the amplitude of the sensed output voltage to the amplitude of the sensed output voltage immediately before the drop is less than the threshold value (n), the controller 8 generates the control signals (J1-J4) based on the sensed AC inverted voltage in such a way that the amplitude of the AC inverted voltage (Vinv) gradually decreases to zero if the amplitude of the AC inverted voltage (Vinv) is greater than zero, and that the amplitude of the AC inverted voltage (Vinv) does not change if the amplitude of the AC inverted voltage (Vinv) is zero. Therefore, when a ratio of a drop of the amplitude of the output voltage (Vo) to the amplitude of the output voltage (Vo) immediately before the drop is greater than or equal to the threshold value (n), the amplitude of the AC inverted voltage (Vinv) is greater than zero, and an average of the magnitude of the total excitation voltage (Ve) is boosted.

Referring to FIG. 1, in view of the above, the power generator system 1 of this embodiment has the following advantages:

1. By virtue of the generator exciter device 5 that is coupled to the voltage regulator 4 in series and that cooperates with the voltage regulator 4 to provide the total excitation voltage (Ve), all types of voltage regulators can be used in the power generator system 1 without modifying the generator exciter device 5.

2. By virtue of the generator exciter device 5 that assists in boosting the average of the magnitude of the total excitation voltage (Ve) when the ratio of the drop of the amplitude of the output voltage (Vo) to the amplitude of the output voltage (Vo) immediately before the drop is greater than or equal to the threshold value, the drop of the amplitude of the output voltage (Vo) and the time that is required for the amplitude of the output voltage (Vo) to recover to the predetermined reference voltage value can be reduced as compared to the power generator system 1 in the absence of the generator exciter device 5.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A power generator system comprising:
   a field winding having a first input terminal and a second input terminal, receiving a total excitation voltage at said first and second input terminals thereof, and generating a magnetic field based on the total excitation voltage;
   an alternator generating an output voltage based on the magnetic field generated by said field winding;
   a voltage regulator having a first output terminal and a second output terminal, coupled to said alternator for sensing the output voltage therefrom, and generating a primary excitation voltage at said first and second output terminals thereof based on the sensed output voltage; and
   a generator exciter device having a first output terminal and a second output terminal, and generating an auxiliary excitation voltage at said first and second output terminals thereof;
   wherein said first and second output terminals of said generator exciter device are coupled respectively to said first input terminal of said field winding and said first output terminal of said voltage regulator, and said second output terminal of said voltage regulator is coupled to said second input terminal of said field winding, so that the auxiliary excitation voltage and the primary excitation voltage are summed into the total excitation voltage;
   wherein the total excitation voltage is greater than or equal to the primary excitation voltage in magnitude;
   wherein said generator exciter device includes:
   an inverter used to receive a DC (direct current) input voltage, and converting the DC input voltage to generate an AC (alternate current) inverted voltage,
   a rectifier coupled to said inverter for receiving the AC inverted voltage therefrom, coupled further to said first and second output terminals of said generator exciter device, and rectifying the AC inverted voltage to generate the auxiliary excitation voltage at said first and second output terminals of said generator exciter device, and a controller coupled to said alternator and said inverter for sensing the output voltage and the AC inverted voltage respectively therefrom, and controlling said inverter based on the sensed output voltage and the sensed AC inverted voltage such that the AC inverted voltage is associated with the output voltage;

wherein said controller obtains a ratio of a drop of an amplitude of the sensed output voltage to the amplitude of the sensed output voltage immediately before the drop, and determines whether the ratio is less than a threshold value; and wherein, when determining that the ratio is greater than or equal to the threshold value, said controller calculates a target voltage value based on the ratio, and controls said inverter based on the sensed AC inverted voltage and the target voltage value in such a way that an amplitude of the AC inverted voltage is stabilized at the target voltage value.

2. The power generator system of claim 1, wherein the ratio is obtained according to the following equation:

$$Rd=(Vavg-Vi)/Vavg,$$

where Rd denotes the ratio, Vavg denotes a moving average of the amplitude of the sensed output voltage, and Vi denotes an instantaneous value of the amplitude of the sensed output voltage.

3. The power generator system of claim 2, wherein the target voltage value is calculated according to the following equation:

$$Vtg=Rd\times\text{Gain},$$

where Vtg denotes the target voltage value, and Gain denotes a predetermined gain.

4. The power generator system of claim 1, wherein, when determining that the ratio is less than the threshold value, said controller controls said inverter based on the sensed AC inverted voltage in such a way that the amplitude of the AC inverted voltage gradually decreases to zero if the amplitude of the AC inverted voltage is greater than zero.

5. A generator exciter device used in a power generator system that includes a field winding, an alternator and a voltage regulator, the field winding having a first input terminal and a second input terminal, receiving a total excitation voltage at the first and second input terminals thereof, and generating a magnetic field based on the total excitation voltage, the alternator generating an output voltage based on the magnetic field generated by the field winding, the voltage regulator having a first output terminal, and a second output terminal that is coupled to the second input terminal of the field winding, the voltage regulator being coupled further to the alternator for sensing the output voltage therefrom, and generating a primary excitation voltage at the first and second output terminals thereof based on the sensed output voltage, said generator exciter device comprising:

a first output terminal;
a second output terminal;

an inverter used to receive a DC (direct current) input voltage, and converting the DC input voltage to generate an AC (alternate current) inverted voltage;

a rectifier coupled to said inverter for receiving the AC inverted voltage therefrom, coupled further to said first and second output terminals of said generator exciter device, and rectifying the AC inverted voltage to generate an auxiliary excitation voltage at said first and second output terminals of said generator exciter device; and a controller adapted to be coupled to the alternator for sensing the output voltage therefrom, coupled further to said inverter for sensing the AC inverted voltage therefrom, and controlling said inverter based on the sensed output voltage and the sensed AC inverted voltage such that the AC inverted voltage is associated with the output voltage;

wherein said first and second output terminals of said generator exciter device are used to be coupled respectively to the first input terminal of the field winding and the first output terminal of the voltage regulator, so that the auxiliary excitation voltage is summed with the primary excitation voltage to produce the total excitation voltage;

wherein the total excitation voltage is greater than or equal to the primary excitation voltage in magnitude;

wherein said controller obtains a ratio of a drop of an amplitude of the sensed output voltage to the amplitude of the sensed output voltage immediately before the drop, and determines whether the ratio is less than a threshold value; and wherein, when determining that the ratio is greater than or equal to the threshold value, said controller calculates a target voltage value based on the ratio, and controls said inverter based on the sensed AC inverted voltage and the target voltage value in such a way that an amplitude of the AC inverted voltage is stabilized at the target voltage value.

6. The generator exciter device of claim 5, wherein the ratio is obtained according to the following equation:

$$Rd=(Vavg-Vi)/Vavg,$$

where Rd denotes the ratio, Vavg denotes a moving average of the amplitude of the sensed output voltage, and Vi denotes an instantaneous value of the amplitude of the sensed output voltage.

7. The generator exciter device of claim 6, wherein the target voltage value is calculated according to the following equation:

$$Vtg=Rd\times\text{Gain},$$

where Vtg denotes the target voltage value, and Gain denotes a predetermined gain.

8. The generator exciter device of claim 5, wherein, when determining that the ratio is less than the threshold value, said controller controls said inverter based on the sensed AC inverted voltage in such a way that the amplitude of the AC inverted voltage gradually decreases to zero if the amplitude of the AC inverted voltage is greater than zero.

* * * * *